United States Patent
Wang et al.

(10) Patent No.: US 11,281,623 B2
(45) Date of Patent: Mar. 22, 2022

(54) METHOD, DEVICE AND COMPUTER PROGRAM PRODUCT FOR DATA MIGRATION

(71) Applicant: EMC IP Holding Company LLC, Hopkinton, MA (US)

(72) Inventors: Yi Wang, Chengdu (CN); Lei Wang, Shanghai (CN); Qingxiao Zheng, Chengdu (CN); Yongsheng Guo, Shanghai (CN); Haitao Li, Chengdu (CN); Jingrong Zhao, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 372 days.

(21) Appl. No.: 16/250,493

(22) Filed: Jan. 17, 2019

(65) Prior Publication Data

US 2019/0220441 A1    Jul. 18, 2019

(30) Foreign Application Priority Data

Jan. 18, 2018 (CN) .......................... 201810050812.5

(51) Int. Cl.
*G06F 16/11* (2019.01)
*G06F 7/08* (2006.01)
*G06F 11/14* (2006.01)
*G06F 16/13* (2019.01)

(52) U.S. Cl.
CPC .............. *G06F 16/119* (2019.01); *G06F 7/08* (2013.01); *G06F 11/14* (2013.01); *G06F 16/116* (2019.01); *G06F 16/137* (2019.01)

(58) Field of Classification Search
CPC ...... G06F 16/119; G06F 11/14; G06F 16/116; G06F 16/137; G06F 7/08; G06F 11/1448; G06F 17/303; G06F 17/30321; G06F 16/2474

See application file for complete search history.

(56) References Cited

U.S. PATENT DOCUMENTS

| | | | |
|---|---|---|---|
| 8,495,022 B1* | 7/2013 | Zhu | G06F 11/1451 707/645 |
| 8,924,352 B1* | 12/2014 | Andruss | G06F 11/1461 707/640 |
| 9,715,434 B1* | 7/2017 | Xu | G06F 11/1453 |
| 2002/0198897 A1* | 12/2002 | Geuss | G06F 16/258 |
| 2008/0235300 A1* | 9/2008 | Nemoto | G06F 16/119 |
| 2009/0192979 A1* | 7/2009 | Lunde | G06F 16/285 |
| 2012/0109940 A1* | 5/2012 | Ishii | G06F 16/9535 707/722 |

* cited by examiner

*Primary Examiner* — Robert W Beausoliel, Jr.
*Assistant Examiner* — Mohammad Solaiman Bhuyan
(74) *Attorney, Agent, or Firm* — Chamberlain, Hrdlicka, White, Williams & Aughtry

(57) ABSTRACT

The present disclosure provides a solution for migrating data. In the solution, a migration tool first receives, from a source server, an index having index values corresponding to a plurality of files stored at the source server. The migration tool then retrieves a location of an index value corresponding to key information file in the index. The migration tool sorts the index based on the retrieved location. The migration tool processes the plurality of files based the sorted index, such that the sorted index causes the key information file to be processed last.

18 Claims, 4 Drawing Sheets

METHOD, DEVICE AND COMPUTER PROGRAM PRODUCT FOR DATA MIGRATION

FIELD

Embodiments of the present disclosure relate to a storage system, and more specifically, to a method and device for data migration.

BACKGROUND

At present, client data are generally backed up at a server. The continuous progress of storage technologies enables the storage system to have better performance and larger capacity. Sometimes, it is required to migrate data from an original storage system or storage server to a more advanced storage system or storage server. When the data at the server are being migrated, it usually needs to consider formats and hierarchical structures of data stored in different types of servers, such that the data migration can be carried out smoothly.

SUMMARY

Embodiments of the present disclosure provide a method, apparatus and computer program product for data migration.

In a first aspect of the present disclosure, there is provided a method for data migration. The method comprises: receiving, from a source server, an index having index values corresponding to a plurality of files stored at the source server, respectively; retrieving a location of an index value corresponding to a key information file in the index, the key information file containing overall information for the plurality of files; sorting the index based on the retrieved location; and processing the plurality of files based on the sorted index, such that the sorted index causes the key information file to be processed last.

In a second aspect of the present disclosure, there is provided an electronic device comprising a processor and a memory coupled to the processor and having instructions stored thereon, the instructions, when executed by the processor, causing the electronic device to perform acts comprising: receiving, from a source server, an index having index values corresponding to a plurality of files stored at the source server, respectively; retrieving a location of an index value corresponding to a key information file in the index, the key information file containing overall information for the plurality of files; sorting the index based on the retrieved location; and processing the plurality of files based on the sorted index, such that the sorted index causes the key information file to be processed last.

In a third aspect of the present disclosure, there is provided a computer program product being tangibly stored on a non-transient computer-readable medium and including machine-executable instructions, the machine-executable instructions, when executed, causing a machine to perform the method according to the first aspect of the present disclosure.

The summary is to introduce a selection of concepts in a simplified form that are further described below in the Detailed Description of Embodiments. This summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to accompanying drawings, the above and other objectives, features, and advantages of the present disclosure will become more apparent, wherein the same reference sign usually refers to the same component in example embodiments of the present disclosure.

DETAILED DESCRIPTION OF EMBODIMENTS

Figure 1:
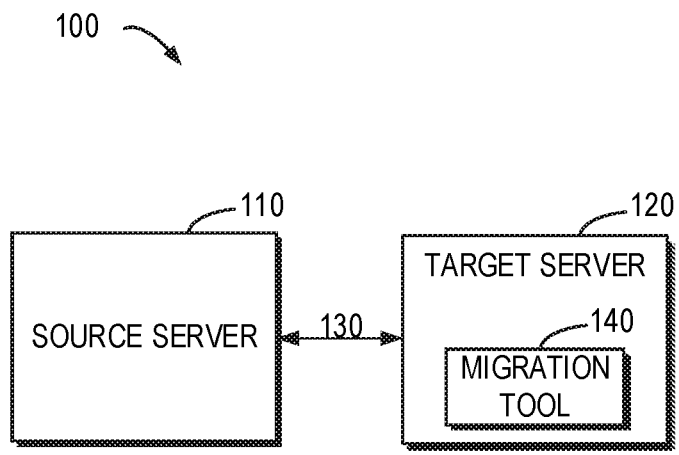
FIG. 1 illustrates a block diagram of a storage system according to embodiments of the present disclosure.

Preferred embodiments of the present disclosure will be described in more details with reference to the drawings. Although the drawings illustrate the preferred embodiments of the present disclosure, it should be appreciated that the present disclosure can be implemented in various manners and should not be limited to the embodiments explained herein. On the contrary, these embodiments are provided to make the present disclosure more thorough and complete and to fully convey the scope of the present disclosure to those skilled in the art.

As used herein, the term "includes" and its variants are to be read as open-ended terms that mean "includes, but not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text can comprise other explicit and implicit definitions.

At present, data of the client are generally backed up at a server. The client stores a large amount of data. The continuous progress of storage technologies enables the storage system to have better performance and a larger capacity. Sometimes, it is required to migrate data from an original storage system or storage server to a more advanced (or different) storage system or storage server. When the data at the server is being migrated, it usually needs to consider formats and hierarchical structures of the data stored in different types of servers, such that the data migration can be carried out smoothly.

Key information is generally stored at the data storage server. Such key information is also known as system information, i.e., overall information of files at the storage server, such as a size, a creation time, and a storage path of the file. When the actual storage location of the key information is different from the excepted storage location, the traditional migration logic may crash. The method of the present disclosure can automatically adjust the order of file migration, such that the key information is processed at last. Thus, even if the storage location of the key information in the backup data is not the expected storage location, the key information can still be correctly processed, so as to guarantee smooth migration.

To at least partially solve the above problem and other potential problems, example embodiments of the present disclosure provide a various embodiments for migrating data. IN one or more embodiments, the present disclosure can process backup data of different storage types in a general way without performing special modifications of backup data of the different storage types, so as to make the migration logic much clearer. It should be understood that the present disclosure is not only used for migrating backup data, but also is applicable to migrating any types of data.

The present disclosure can make the migration tools more reliable. In the present disclosure, a migration tool receives an index from a source server, wherein the index has index values corresponding to a plurality of files stored at the source server. Then, the migration tools retrieve the location of the index value corresponding to the key information file in the index. The key information file contains overall information for the plurality of files. Afterwards, the migration tool sorts the index based on the retrieved location. The migration tool processes the plurality of files based on the sorted index, such that the sorted index causes the key information file to be processed last.

FIG. 1 illustrates a block diagram of a storage system 100 according to embodiments of the present disclosure. It should be understood that the structure and function of the storage system 100 are described merely for the purpose of examples, rather than suggesting any restrictions over the scope of the present disclosure. That is, some components in the storage system 100 can be omitted or replaced while other components not shown can be added into the storage system 100. Embodiments of the present disclosure can be embodied in different structures and/or functions. The storage system 100 in the present disclosure can include Redundant Array of Independent Disks (RAID).

As shown in FIG. 1, the storage system 100 includes a source server 110 and a target server 120. A data interface 130 exists between the source server 110 and the target server 120. The data interface 130 can be a wired connection or wireless connection. The data interface 130 between the source server 110 and the target server 120 is a bidirectional data interface.

The backup data is stored on the source server 110. It may be expected to move the backup data from the source server 110 to the target server 120. Accordingly, a migration tool 140 is used to complete backup data movement from the source server 110 to the target server 120. FIG. 1 illustrates a typical migration situation, i.e., migrating the data via the data interface 130 from the source server 110 to the target server 120.

In some embodiments, the migration tool 140, for example, can be a software-implemented application or known as an application program, which can be deployed on the source server 110, on the target server 120, or on both the source server 110 and the target server 120. As a non-restrictive example, the migration tool 140 is deployed on the target server 120. Alternatively or additionally, the migration tool 140 also can be implemented by hardware, firmware or the combination thereof.

When the source server 110 and the target server 120 have different infrastructures, the backup data are stored in different formats on each server. For example, the target server 120 may be a new-type data storage server, e.g., a server using integrated data domain. The migration tool 140 transverses the backup data on the source server 110 and converts the backup data into a format expected by the target server 120, and then backs up the data to the target server 120.

The hierarchical structure of the files stored in the source server 110 can be tree-shaped, and a key information file can be formed for the hierarchical structure files. The key information file can also be known as a system information file including overall information of the backup data, such as a size, a creation time and a storage path of the file. In the present disclosure, the system information file is also known as system information, and the key information file is also known as key information.

In a traditionally system, when processing source backup data, a migration tool moves backup files from a bottom level directory to a top level directory. After a key information file in the source backup is found, backup information, such as backup size, path and the like, can be obtained. Afterwards, the migration tool alters, according to a new data structure in the target server, some corresponding values of the backup data, such as index values. The migration tool will write the altered values into the target server.

After the key information message being written into the target server, the migration tool will close the connection and finalize information backup. The reason for closing the connection and finalizing information backup is that the key information includes overall information of the backup data, such as a size, a creation time and a storage path of the file. Accordingly, when the key information is written into the target server, the backup data should no longer be altered; otherwise, the key information of the backup data may be inconsistent with real conditions of backup data. In other words, after the real key information file is already formed, if data is further migrated from the source server to the target server, the key information file cannot reflect the conditions of the data migrated subsequent to the formation of the key information file.

Figure 2:
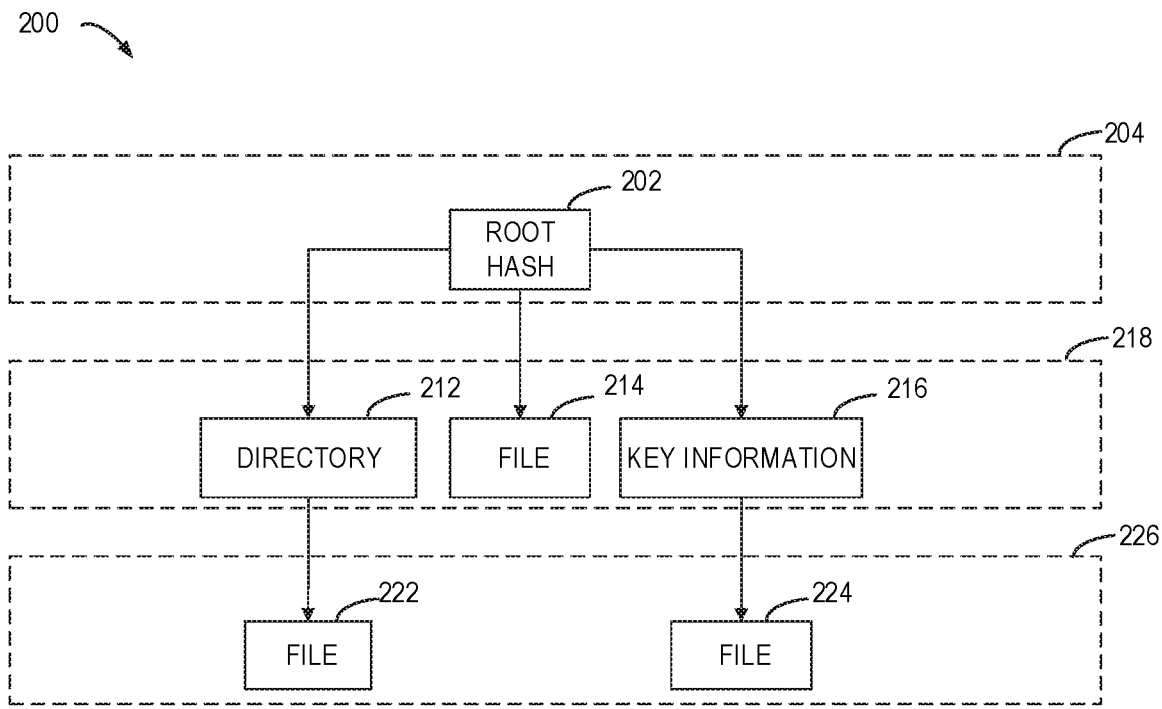
FIG. 2 illustrates a schematic diagram of a data storage structure according to embodiments of the present disclosure.

FIG. 2 illustrates a storage structure 200 of backup data, which is a traditional type of storage structure. According to FIG. 2, the hierarchical structure of files needing to be migrated is shown, wherein each block represents a hash value corresponding to a file. In FIG. 2, the key information 216 exists at level 218 of the backup data, so the mechanism of processing the backup data from the bottom level to the top level is feasible for this scenario. At level 204, a root hash 202 is stored. The root hash 202 is an overall hash representation of backup files. At level 218, a directory 212, a file 214, and key information 216 are stored. At level 226, a file 222 and a file 224 are stored. In FIG. 2, for the sake of simplification, a hash value corresponding to a file or a directory is directly called a file or a directory, e.g., directory 212 refers to a hash value corresponding to the directory.

In the example of FIG. 2, the structure of the index is a hash tree. In other words, each node in the storage structure 200 represents a hash value, which corresponds to a particular file in the source server 110. The hash value is obtained by performing hash processing on a particular file. For example, in some embodiments, information of the particular file, such as a name, a creation time, a size, a storage path, and the like, can act as an input of a hash function to acquire a hash value. The hash value can serve as the index of the particular file and can provide an entry to the particular file. In the present disclosure, index structure is also referred to as index for short, and hash and hash value can be used interchangeably.

When files of the storage structure shown in FIG. 2 are processed, a migration tool searches from the top level to the bottom level, and then processes the backup data from the bottom level to the top level. In other words, the direction of searching the hash structure is opposite to the direction of processing the backup files. After all files and directories 212 and 214 on the level 218 have been processed, the key information 216 will be processed. Then, related information of the backup data is determined. In such a case, no more backup data will be written after the key information 216 has been written.

Figure 3:
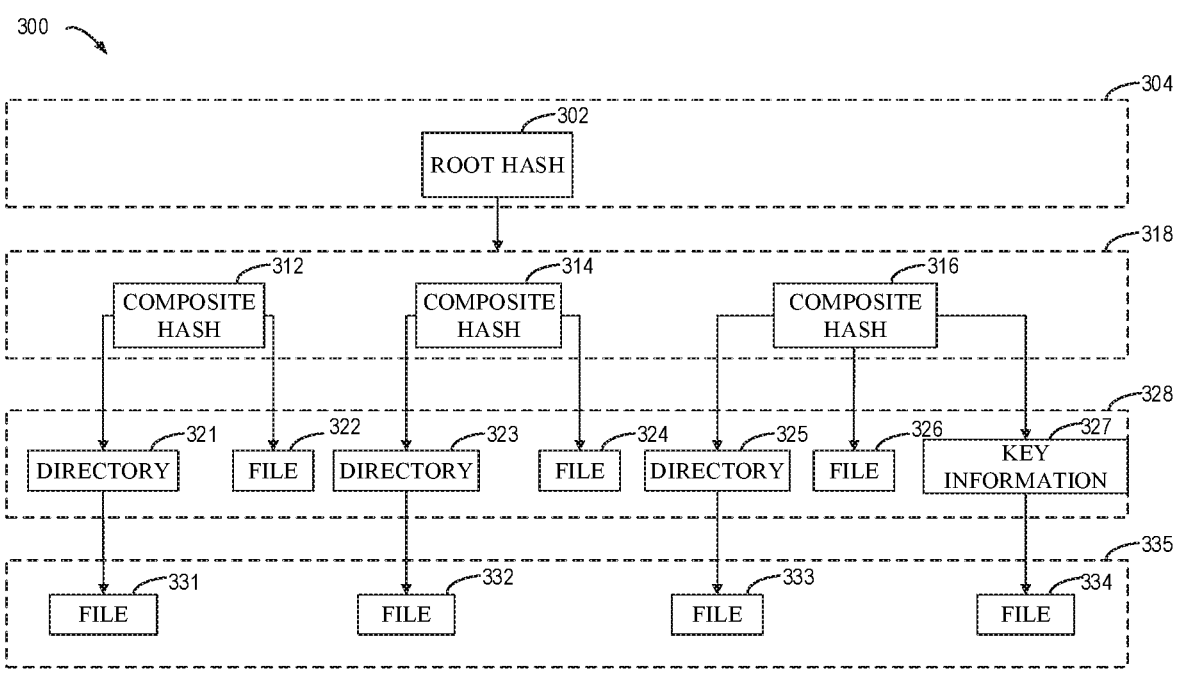
FIG. 3 illustrates a schematic diagram of a further data storage structure according to embodiments of the present disclosure.

In case that the types of storage structure of the backup data are different, the storage location of the key information file may vary correspondingly. FIG. 3 depicts a different type of storage structure than that of FIG. 2, wherein the key information file is stored at a different location.

In FIG. 3, the level 304 includes a. The root hash 302 is an overall hash representation of the backup files. The level 318 consists of a composite hash 312, a composite hash 314, and a composite hash 316. A composite hash is a combination of atomic hashes. In other words, the composite hash 312 is a hash value of a combination of a directory 321 and a file 322 of the level 328 and a file 331 of the level 335. An atomic hash is directly obtained from a hash function while a composite hash is acquired from a combination of atomic hashes. Therefore, if related information of the data corresponding to the composite hash, such as storage location of the data, is required to be obtained, the composite hash 312 should be parsed. Likewise, the composite hash 314 is acquired from the combination of a directory 323 and a file 324 of the level 328 as well as a file 332 of the level 335. The composite hash 316 is obtained from the combination of a directory 325, a file 326 and key information 327 of the level 328 as well as a file 333 and a file 324 of the level 335. An atomic hash is a direct index of data while each of the composite hash 312, the composite hash 314, and the composite hash 316 points to an individual data set. As it is required to parse the composite hash, the key information is not stored in the level 318. According to FIG. 3, the key information 327 is stored in the level 328.

In FIG. 3, upon migration of backup data, the composite hash 312, the composite hash 314, and the composite hash 316 may be processed in parallel as three sub-tasks. When the migration tool finds the key information 327 and processes the data, it will close the connection and finalize information backup. However, when the information backup is finalized, the sub-tasks of data in the composite hash 312 and the composite hash 314 may still be working, which may cause problems with migration. For example, closing the connection with the target server 120 will cause a failure of the ongoing migration sub-task. Even if the connection 130 is not closed at this moment, data are not allowed to be written into the target server 130. This is because the information backup has been completed and writing more data after completion may cause inconsistency between backup information data on the target server 130 and actual data.

More importantly, the key information in different types of backup data may be positioned at different storage locations, so it is difficult to know the location of the key information in advance and to correspondingly change the order of data migration. Further, the migration tool cannot wait for other processes to be completed; otherwise, it will block the main process, which may cause the migration never to be completed.

The present disclosure can solve the problem that the key information is stored at different locations in different types of backup systems. Fast searches are performed on a hash tree to obtain a location of the key information 327 in the hash tree. The searching procedure only reads data in the source server 110 without writing any data into the target server 120. When the location of the key information 327 is found, the migration tool will record information of the location, including hash of an upper level of the key information. Afterwards, the migration tool will reorder the hash structure. The obtained order will cause the hash containing the key information 327 to be processed last, so as to ensure that other data movements will not occur after processing the key information 327. The data migration method will be described in details below.

Figure 4:
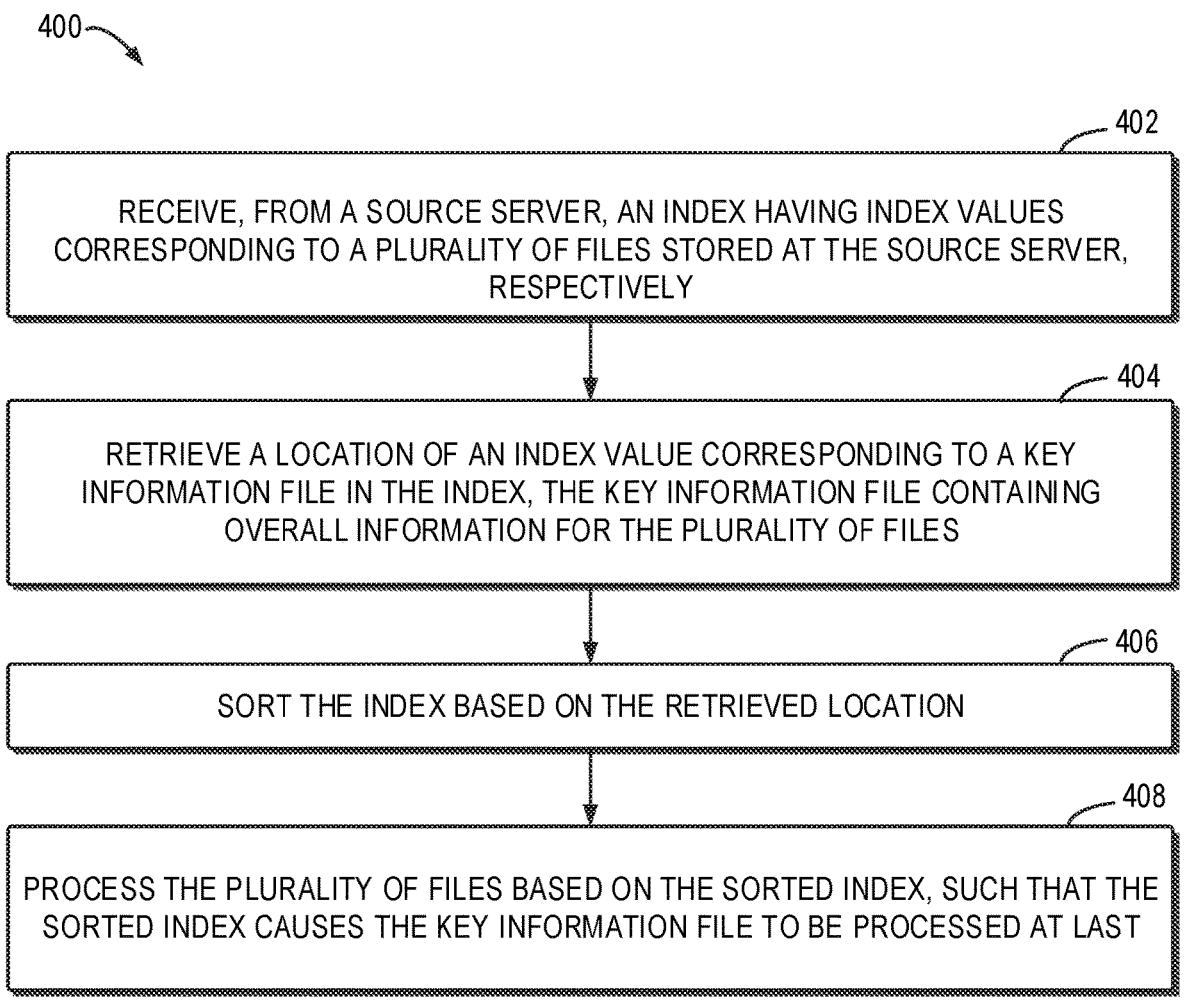
FIG. 4 illustrates a flowchart of a method for data migration according to embodiments of the present disclosure.

FIG. 4 illustrates a flowchart of a method 400 for data migration according to embodiments of the present disclosure. It should be understood that the method 400 also can include additional steps not shown and/or actions that can be omitted, and the scope of the present disclosure is not restricted in this regard.

At 402, the migration tool receives an index from a source server 110. The index has index values corresponding to a plurality of files stored at the source server 110. As a non-restrictive example, the index is tree. An index value for each file in the plurality of files is a hash value acquired for each file. The structure of backup data at the source server 110 can be the storage structure 200 or the storage structure 300. The present disclosure will be described by taking the storage structure 300 serving as the index as an example. Because an index of a file contains less data amount compared with the file itself, processing the index of the file, instead of the file itself, can effectively reduce processing time.

In some embodiments, types of the plurality of files comprise directory files and data files. As shown in FIG. 3, directory files include directory files 321, 323, and 325, and data files include files 322, 324, 326, 331, 332, 333, and 334. Besides, the plurality of files also includes key information 327. It should be appreciated that the plurality of files also can include other types of files. Through the hierarchical storage data, the storage structure of the file is made clearer, which can make data retrieval much easier.

At 404, the migration tool retrieves a location of the index value corresponding to the key information file 327 in the index. The key information file 327 contains overall information for the plurality of files. The index location of the key information file 327 is retrieved to prevent migration errors caused by not processing the key information file 327 at last during multitask parallel processing.

As a non-restrictive embodiment, the content of the key information file 327 includes at least one of the following: size of each file in the plurality of files, storage path of each file in the plurality of files and creation time of each file in the plurality of files. By storing the above information of the plurality of files, it can enable the key information file 327 to reflect various characteristics of the plurality of files, so as to provide overall information of the plurality of files.

In some embodiments, acquiring the location of the index value corresponding to the key information file 327 in the index can be executed through obtaining a file name or attribute via parsing the index value. When the file name or attribute is respectively identical to the name or attribute of the key information file 327, it can be determined that this file is the key information file 327. For example, when the name of a certain file is determined to be ".system_info," this file is the key information file 327. For another example, when the attribute of a certain file is determined as internally created, this file is the key information file 327. In a further embodiment, a certain file can be determined as the key information file 327 or not by comprehensively considering both the file name and attribute. In such embodiment, only the name or the index value of the file needs to be determined, without analyzing specific contents in the file, so as to expedite the procedure of confirming the key information file 327.

Figure 5:
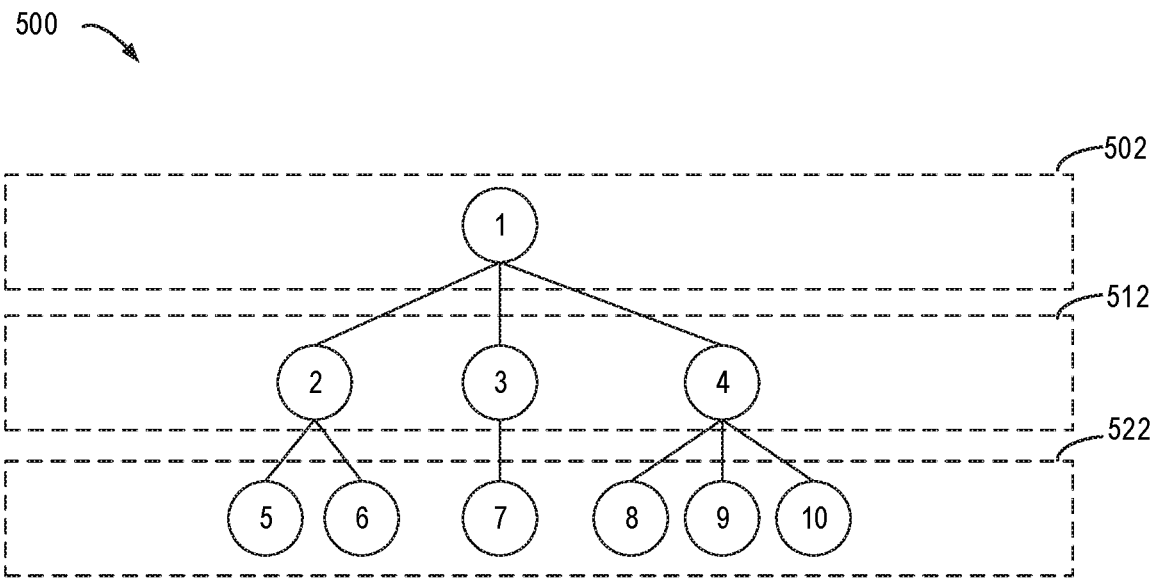
FIG. 5 illustrates a schematic diagram of a searching procedure of a hash tree according to embodiments of the present disclosure.

In some embodiments, the hash structure is a tree structure. In this embodiment, the migration tool will look up the key information by searching the tree. In most cases, the hash value corresponding to the key information exists in the top left leaf of the tree. Accordingly, the migration tool can more find the key information faster by breadth-first transverse, i.e., searching the tree from top to bottom and from left to right. FIG. 5 below illustrates the order of searching the hash tree, and this search utilizes the breadth-first transverse. In other words, the searching order of FIG. 5 is to complete the search from the level 502 to the level 512 and then to the level 522 in the order of numbers 1-10. This searching procedure can reduce the time for finding the key information file 327.

In some embodiments, by using the breadth-first transverse, the key information location quickly searched. Because the key information file 327 represents the overall information of the backup data, so the key information file generally exists at the top level of the hash tree. Thus, the breadth-first transverse employed by the present disclosure is helpful to find the key information faster. Since a search transverses the hash tree from the top to the bottom, it is likely to find information related to the key information at the top of the tree, such as key information, entry information and the like, which can save time for searching from the bottom.

Now return to FIG. 4, at 406, the migration tool 140 sorts the index according to the retrieved location. It will be explained by taking the sorting of the hash tree structure shown in FIG. 3 as an example. For level 318, the composite hash 312 and 314 are arranged before the composite hash 316. For level 328, the key information 327 is arranged behind the directory 325 and the file 326 to be processed. It should be understood that the sorting in the present disclosure is directed against the processing sequence of the files corresponding to each hash value in the hash tree. After the sorting, the key information file 327 will be processed at last, so as to avoid the probability of error occurrence during data migration procedure.

At 408, the migration tool 140 processes a plurality of files based on the sorted index, such that the sorted index structure causes the key information file 327 to be processed at last. The present disclosure can make the migration tool 140 more reliable. When the storage location of the key information is different from the excepted storage location, the migration logic in prior arts may crash easily. The method of the present disclosure can automatically adjust the order of file migration, such that the key information file 327 is to be processed at last. Thus, even if the storage location of the key information file 327 in the backup data is not the expected storage location, the key information file 327 can still be correctly processed, so as to guarantee a smooth migration.

In some embodiments, processing the plurality of files based on the sorted index includes converting the plurality of files into a format required by the target server 120. It should be understood that when the data formats required by the source server 110 and the target server 120 are the same, there is no need to converting data formats. The examples of processing the data format include change of compressed format, change of sort order, change of hierarchical structure and so on. The file after format conversion can adapt to the storage structure of the target server 120, which can improve storage efficiency and lower the probability of error occurrence during data migration procedure.

In some embodiments, processing the plurality of files includes generating a new index value for each processed file. Then a new index can be formed based on the generated new index value, so as to be store in the target server 120. In a non-restrictive embodiment, the new index is still in the form of a hash tree. The formation of a new index can reduce the time for retrieving data in the target server 120. In such an embodiment, the new index can be used for further optimizing storage structure in the target server 120 and enhancing storage efficiency.

Figure 6:
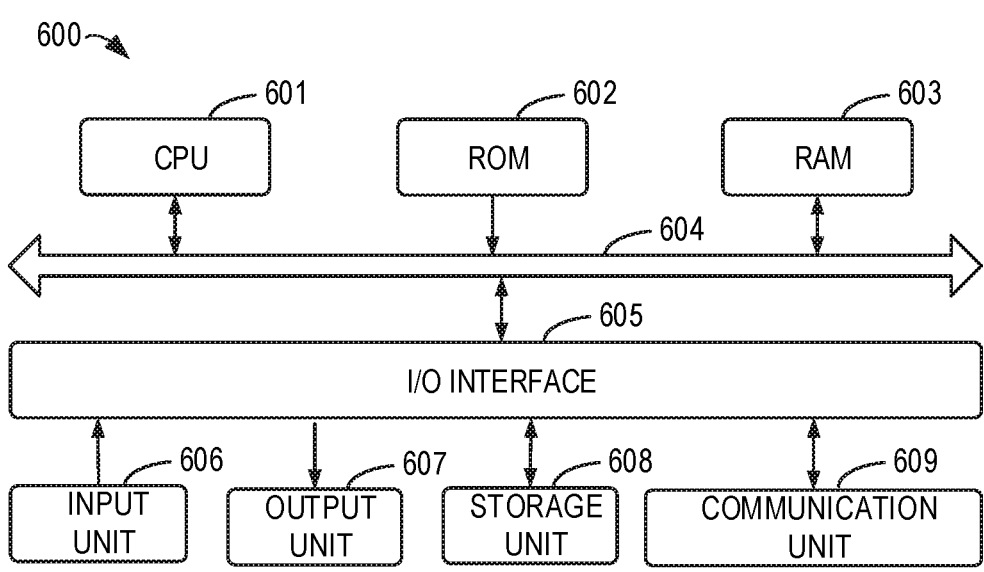
FIG. 6 illustrates a schematic block diagram of an example device capable of implementing embodiments of the present disclosure.

FIG. 6 illustrates a schematic block diagram of a device 600 for implementing embodiments of the present disclosure. As shown, the device 600 comprises a central process unit (CPU) 601, which can execute various suitable actions and processing based on the computer program instructions stored in the read-only memory (ROM) 602 or computer program instructions loaded in the random-access memory (RAM) 603 from a storage unit 608. The RAM 603 can also store all kinds of programs and data required by the device 600 for operation. CPU 601, ROM 602 and RAM 603 are connected to each other via a bus 604. The input/output (I/O) interface 605 is also connected to the bus 604.

Multiple components in the device 600 are connected to the I/O interface 605, including: an input unit 606, such as a keyboard, a mouse, and the like; an output unit 607, such as various kinds of displays and loudspeakers; a storage unit 608, such as disks and optical disks; and a communication unit 609, such as a network card, a modem, a wireless transceiver and the like. The communication unit 609 allows the device 600 to exchange information/data with other devices via the computer network, such as Internet, and/or various telecommunication networks.

The above described each procedure and processing, such as the method 300, can also be executed by the processing unit 601. For example, in some embodiments, the method 300 can be implemented as a computer software program tangibly included in a machine-readable medium, e.g., the storage unit 608. In some embodiments, the computer program can be partially or fully loaded and/or mounted to the device 600 via ROM 602 and/or communication unit 609. When the computer program is loaded to RAM 603 and executed by the CPU 601, one or more steps of the above described method 200 or 300 can be implemented. Alternatively, in other embodiments, CPU 601 also can be configured in other suitable manners to implement the above procedure/method.

In various implementations, the present disclosure can make a migration tool more reliable. When the key information location is different from the expected location, migration logic in prior arts can easily crash. The method of the present disclosure can automatically adjust the order of file migration, such that the key information is processed at last. Thus, even if the location of the key information in the backup data is not in the expected location, the key information can still be correctly processed, so as to guarantee a smooth migration.

In addition, various implementations of the present disclosure can rapidly search the key information location. Because the key information represents the overall information of the backup data, so the key information file generally exists at the top level of a hash tree. Thus, the breadth-first transverse employed by the present disclosure is helpful to find the key information faster. Since the search transverses the hash tree from the top to the bottom, information related to the key information, such as key information, is likely to be found at the top of the tree, which can save time for searching the tree from the bottom.

Moreover, various implementations of the present disclosure can make migration logic clearer. The present disclosure can process different types of backup data using a common way without performing special modifications for different backup, such that the migration logic is much clearer.

The present disclosure can be a method, a device, a system and/or a computer program product. The computer program product can include a computer-readable storage medium, on which the computer-readable program instructions for executing various aspects of the present disclosure are loaded.

The computer-readable storage medium can be a tangible device that maintains and stores instructions utilized by the instruction executing devices. The computer-readable storage medium can be, but is not limited to, such as an electrical storage device, a magnetic storage device, an optical storage device, an electromagnetic storage device, a semiconductor storage device or any appropriate combinations of the foregoing. More concrete examples of the computer-readable storage medium (non-exhaustive list) include the following: a portable computer disk, a hard disk, a random-access memory (RAM), a read-only memory (ROM), erasable programmable read-only memory (EPROM or flash), a flash medium SSD, PCM SSD, 3D interleaved memory (3DX-Point), a static random-access memory (SRAM), a portable compact disk read-only memory (CD-ROM), digital versatile disk (DVD), a memory stick, a floppy disk, a mechanically encoded device, such as punched cards embossment within a groove stored with instructions thereon, and any appropriate combinations of the foregoing. A computer-readable storage medium, as utilized herein, is not interpreted as transient signals per se, such as radio waves or freely propagated electromagnetic waves, electromagnetic waves propagated via waveguide or other transmission media (such as optical pulses through a fiber-optic cable), or electric signals propagated through an electric wire.

Computer-readable program instructions described herein can be downloaded to respective computing/processing device from a computer readable storage medium, or to an external computer or external storage device via networks, for example, the Internet, a local area network, a wide area network and/or a wireless network. The network may comprise copper transmission cables, optical fiber transmission fibers, wireless transmission, routers, firewalls, switches, gateway computers and/or edge servers. A network adapter card or network interface in each computing/processing device receives computer readable program instructions from the network and forwards the computer readable program instructions for storage in the computer-readable storage medium within the respective computing/processing device.

Computer program instructions for carrying out operations of the present disclosure may be assembly instructions, instructions of instruction set architecture (ISA), machine instructions, machine dependent instructions, microcode, firmware instructions, state setting data, or either source code or object code written in any combinations of one or more programming languages, wherein the programming languages, including object-oriented programming languages, such as Smalltalk, C++ or the like, and conventional procedural programming languages, such as the "C" language or similar programming languages. The computer readable program instructions may execute entirely on the user's computer, partly on the user's computer, as a stand-alone software package, partially on the user computer and partially on the remote computer, or completely on the remote computer or server. In the case where remote computer is involved, the remote computer can be connected to the user computer via any type of networks, including a local area network (LAN) and a wide area network (WAN), or to the external computer (for example, through the Internet using an Internet Service Provider). In some embodiments, state information of the computer-readable program instructions is used to customize an electronic circuit, for example, programmable logic circuits, field programmable gate arrays (FPGA) or programmable logic arrays (PLA). The electronic circuit can execute computer-readable program instructions to implement various aspects of the present disclosure.

Various aspects of the present disclosure are described herein with reference to flow charts and/or block diagrams of method, apparatuses (systems) and computer program products according to embodiments of the present disclosure. It should be understood that each block of the flow charts and/or block diagrams and the combination of each block in the flow chart and/or block diagram can be implemented by computer-readable program instructions.

These computer-readable program instructions may be provided to the processing unit of a general-purpose computer, a dedicated computer or other programmable data processing apparatuses to produce a machine, such that the instructions that, when executed by the processing unit of the computer or other programmable data processing apparatuses, generate an apparatus for implementing functions/actions stipulated in one or more blocks in the flow chart and/or block diagram. These computer-readable program instructions may also be stored in the a computer readable storage medium and that can direct a computer, a programmable data processing apparatus, and/or other devices to function in a particular manner, such that the computer readable medium stored with instructions comprises an article of manufacture including instructions for implementing various aspects of the functions/actions as specified in one or more blocks of the flow chart and/or block diagram.

The computer-readable program instructions may also be loaded onto a computer, other programmable data processing apparatuses or other devices to execute a series of operation steps to be performed on the computer, other programmable data processing apparatuses or other devices to produce a computer implemented procedure. Therefore, the instructions executed on the computer, other programmable data processing apparatuses or other devices implement the functions/acts specified in one or more blocks of the flow chart and/or block diagram.

The flowchart and block diagrams in the drawings illustrate architecture, functions, and operations of possible implementations of systems, methods, and computer program products according to various embodiments of the present disclosure. In this regard, each block in the flowchart or block diagrams may represent a module, a part of program segment or instruction, wherein the module and the part of program segment or instruction include one or more executable instructions for performing stipulated logic functions. In some alternative implementations, the functions indicated in the block diagram can also take place in an order different from the one indicated in the figures. For example, two successive blocks may, in fact, be executed in parallel or in a reverse order dependent upon the functionality the involved. It will also be noted that each block of the block diagrams and/or flowchart and combinations of the blocks in the block diagram and/or flow chart can be implemented by a hardware-based system dedicated for executing stipulated functions or acts, or by a combination of dedicated hardware and computer instructions.

The description of various embodiments of the present disclosure have been presented for the purpose of illustration, but are not intended to be exhaustive or limited to the embodiments disclosed. Many modifications and variations will be apparent to those skilled in the art without departing from the scope and spirit of the described embodiments. The terminology used herein was chosen to best explain the principles of the embodiments, the practical application or technologies found in the marketplace, or to enable those skilled in the art to understand the embodiments disclosed herein.

We claim:

1. A method for data migration, the method comprising:
   receiving, from a source server, an index having index values corresponding to a plurality of files stored at the source server, wherein the plurality of files comprises a key information file;
   retrieving a location of an index value corresponding to the key information file in the index, the key information file is a separate file stored on the source server and comprises: information associated with each of the plurality of files, wherein the information comprises at least one selected from a group consisting of: a size of each file in the plurality of files, a storage path of each file in the plurality of files, and a creation time of each file in the plurality of files;
   sorting the index using the retrieved location to obtain a sorted index comprising a processing sequence for the plurality of files with the key information file being last in the processing sequence; and
   processing the plurality of files based on the sorted index, wherein, based on the processing sequence of the sorted index, the key information file is processed after all other files of the plurality of files have been processed.

2. The method of claim 1, wherein processing the plurality of files comprises:
   converting the plurality of files into a format required by a target server.

3. The method of claim 1, wherein the index is a tree, and wherein an index value for each of the plurality of files is a hash value for each file.

4. The method of claim 3, wherein retrieving the location of the index value corresponding to the key information file in the index comprises:
   traversing the index by breadth-first transverse.

5. The method of claim 3, wherein types of the index values in the index comprises an atomic index value and a composite index value, wherein the atomic index value is formed for each of the plurality of files, and wherein the composite index value is formed for one or more atomic index values.

6. The method of claim 1, further comprising:
   generating a new index value for each processed file; and
   forming, based on the generated new index value, a new index to be stored.

7. The method of claim 1, wherein retrieving the location of the index value corresponding to the key information file in the index comprises:
   obtaining a name or attribute of a file by parsing an index value;
   determining whether the name or attribute of the file is associated with a name or attribute of the key information file;
   determining, in response to the name or attribute of the file being associated with the name or attribute of the key information file, determining that the file is the key information file.

8. The method of claim 1, wherein types of the plurality of files comprise a directory file and a data file.

9. An electronic device, comprising a processor and a memory coupled to the processor and having instructions stored thereon, the instructions, when executed by the processor, causing the electronic device to perform a method, the method comprising:
   receiving, from a source server, an index having index values corresponding to a plurality of files stored at the source server, wherein the plurality of files comprises a key information file;
   retrieving a location of an index value corresponding to the key information file in the index, the key information file is a separate file stored on the source server and comprises: information associated with each of the plurality of files, wherein the information comprises at least one selected from a group consisting of: a size of each file in the plurality of files, a storage path of each file in the plurality of files, and a creation time of each file in the plurality of files;
   sorting the index using the retrieved location to obtain a sorted index comprising a processing sequence for the plurality of files with the key information file being last in the processing sequence; and
   processing the plurality of files based on the sorted index, wherein, based on the processing sequence of the sorted index, the key information file is processed after all other files of the plurality of files have been processed.

10. The electronic device of claim 9, wherein processing the plurality of files comprises:
    converting the plurality of files into a format required by a target server.

11. The electronic device of claim 9, wherein the index is a tree, and wherein an index value for each of the plurality of files is a hash value for each file.

12. The electronic device of claim 11, wherein retrieving the location of the index value corresponding to the key information file in the index comprises:
    traversing the index by breadth-first transverse.

13. The electronic device of claim 11, wherein types of the index value in the index comprises an atomic index value and a composite index value, wherein the atomic index value is formed for each of the plurality of files, and wherein the composite index value is formed for one or more atomic index values.

14. The electronic device of claim 9, wherein the method further comprise:
    generating a new index value for each processed file; and
    forming, based on the generated new index value, a new index to be stored.

15. The electronic device of claim 9, wherein retrieving the location of the index value corresponding to the key information file in the index comprises:
    obtaining a name or attribute of a file by parsing an index value;
    determining whether the name or attribute of the file is associated with a name or attribute of the key information file;
    determining, in response to the name or attribute of the file is associated with the name or attribute of the key information file, respectively, the file as the key information file.

16. The electronic device of claim 9, wherein types of the plurality of files comprise a directory file and a data file.

17. A computer program product being tangibly stored on a non-transitory computer-readable medium and including machine-executable instructions, the machine-executable instructions, when executed, causing a machine to perform a method, the method comprising:

receiving, from a source server, an index having index values corresponding to a plurality of files stored at the source server, wherein the plurality of files comprises a key information file;

retrieving a location of an index value corresponding to the key information file in the index, the key information file is a separate file stored on the source server and comprises: information associated with each of the plurality of files, wherein the information comprises at least one selected from a group consisting of: a size of each file in the plurality of files, a storage path of each file in the plurality of files, and a creation time of each file in the plurality of files;

sorting the index using the retrieved location to obtain a sorted index comprising a processing sequence for the plurality of files with the key information file being last in the processing sequence; and processing the plurality of files based on the sorted index, wherein, based on the processing sequence of the sorted index, the key information file is processed after all other files of the plurality of files have been processed.

18. The computer program product of claim 17, wherein retrieving the location of the index value corresponding to the key information file in the index comprises:

obtaining a name or attribute of a file by parsing an index value;

determining whether the name or attribute of the file is associated with a name or attribute of the key information file;

in response to the name or attribute of the file being associated with the name or attribute of the key information file, determining that the file is the key information file.

* * * * *